United States Patent
Csutak

(10) Patent No.: US 7,793,543 B2
(45) Date of Patent: Sep. 14, 2010

(54) METHOD OF MEASURING BOREHOLE GRAVITATIONAL ACCELERATION

(75) Inventor: Sebastian Csutak, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 546 days.

(21) Appl. No.: 11/744,314

(22) Filed: May 4, 2007

(65) Prior Publication Data
US 2008/0271533 A1 Nov. 6, 2008

(51) Int. Cl.
*G01P 15/08* (2006.01)
(52) U.S. Cl. .................... 73/514.27; 356/482
(58) Field of Classification Search .......... 73/514.26, 73/514.27; 356/482
See application file for complete search history.

(56) References Cited

U.S. PATENT DOCUMENTS

| | | | |
|---|---|---|---|
| 4,992,656 | A | 2/1991 | Clauser |
| 5,013,909 | A | 5/1991 | Sondergeld et al. |
| 6,437,916 | B1 | 8/2002 | McLeod et al. |
| 6,668,111 | B2 | 12/2003 | Tapalian et al. |
| 6,779,402 | B2 | 8/2004 | Rud et al. |
| 6,789,424 | B2 | 9/2004 | Knudsen et al. |
| 6,888,972 | B2 | 5/2005 | Berg et al. |
| 7,054,011 | B2 | 5/2006 | Zhu et al. |
| 7,466,424 | B2 * | 12/2008 | Nathan et al. .......... 356/482 |
| 2002/0186740 | A1 | 12/2002 | Seiber et al. |
| 2003/0094281 | A1 | 5/2003 | Tubel |
| 2004/0008920 | A1 | 1/2004 | Endicott |
| 2004/0074299 | A1 | 4/2004 | Rud et al. |
| 2004/0149037 | A1 | 8/2004 | Digonnet et al. |
| 2004/0179573 | A1 | 9/2004 | Armani et al. |
| 2004/0237648 | A1 | 12/2004 | Jones et al. |
| 2004/0244485 | A1 | 12/2004 | Joseph et al. |
| 2005/0076713 | A1 | 4/2005 | Knudsen et al. |
| 2005/0111776 | A1 | 5/2005 | Martin et al. |
| 2005/0163185 | A1 | 7/2005 | Vahala et al. |
| 2005/0232531 | A1 | 10/2005 | Hadley et al. |
| 2005/0271318 | A1 | 12/2005 | Takiguchi et al. |
| 2006/0176927 | A1 | 8/2006 | Schwartz et al. |
| 2006/0219009 | A1 | 10/2006 | Maas et al. |
| 2006/0236762 | A1 | 10/2006 | Meyer |
| 2006/0256828 | A1 | 11/2006 | Schwartz et al. |
| 2007/0110365 | A1 | 5/2007 | Malkin et al. |
| 2007/0189658 | A1 | 8/2007 | Maas |
| 2007/0214885 | A1 | 9/2007 | Chernyak et al. |

OTHER PUBLICATIONS

Rokhsari, et al. "Theoretical and Experimental Study of Radiation Pressure-Induced Mechanical Oscillations (Parametric Instability) in Optical Microcavities". IEEE Journal of Selected Topics in Quantum Electronics, vol. 12. No. 1, Jan./Feb. 2006.

(Continued)

*Primary Examiner*—John E Chapman
(74) *Attorney, Agent, or Firm*—Cantor Colburn LLP

(57) ABSTRACT

A sensor adapted for measuring acceleration, the sensor including a light source for illuminating an optical cavity; the optical cavity oriented for receiving light from the source, the optical cavity comprising a quality factor greater than or equal to about 10,000; and a photodetector for measuring a resonant frequency of light emitted from the optical cavity.

20 Claims, 9 Drawing Sheets

OTHER PUBLICATIONS

Vahala, Kerry J., "Optical microcavites" insight review articles. Nature. vol. 424. Aug. 14, 2003. pp. 839-846.

Armani, et al. "Ultra-high-Q toroid microcavity on a chip". Letters to nature. Nature. vol. 42. Feb. 27, 2003. www.nature.com/nature. pp. 925-928.

Aoki, et al. "Observation of strong coupling between one atom and amonolithic microresonator". Letters. Nature. vol. 443. Oct. 12, 2006. pp. 671-674.

Kippenberg, et al. "Analysis of Radiation-Pressure Induced Mechanical Oscillation of an Optical Microcavity". Physical Review Letters. PRL 95, 033901 (2005) 4 pages.

Watson, et al. "Ultralow Loss, High Q, Four Port Resonant Couplers for Quantum Optics and Photonics". Physical Review Letters. vol. 92. No. 25. Jun. 25, 2004. 4 pages.

Ilchenko, et al. "Optical Resonators with Whispering-Gallery Modes-Part II: Applications" IEEE Journal of Selected Topics in Quantum Electronics, vol. 12. No. 1, Jan./Feb. 2006. pp. 15-32.

Mastko, et al. "Optical Resonators with Whispering-Gallery Modes-Part 1: Basics". IEEE Journal of Selected Topics in Quantum Electronics, vol. 12, No. 1. Jan./Feb. 2006.

Barclay, et al. "Nonlinear response of silicon photonic crystal microresonators excited via an integrated waveguide and fiber taper". Optics Express. vol. 13. No. 3. Feb. 7, 2005. pp. 801-820.

Song, et al. "Ultra-high-Q photonic double-heterostructure nanocavity". Letters. Nature materials. vol. 4. Mar. 2005. www.nature.com/naturematerials. pp. 207-210.

Notomi, et al. "Waveguides, resonators and their coupled elements in photonic crystal slabs". Optics Express. vol. 12. No. 8. Apr. 19, 2004. pp. 1551-1561.

Chao, et al. "Polymer Microring Resonators for Biochemical Sensing Applications". IEEE Journal of Selected Topics in Quantum Electronics, vol. 12, No. 1 , Jan./Feb. 2006. pp. 134-1421.

Vernooy, et al. "High-Q measurements of fused-silica microspheres in the near infrared". Optics Letters. vol. 23. No. 4. Feb. 15, 1998. pp. 247-249.

Asano, et al. "Ultrahigh-Q Nanocavities in Two-Dimensional Photonic Crystal Slabs". IEEE Journal of Selected Topics in Quantum Electronics, vol. 12. No. 6. Nov./Dec. 2006. pp. 1123-1134.

Vorckel, et al. "Asymmetrically Coupled Silicon-On-Insulator Microring Resonators for compact Add-Drop Multiplexers". IEEE Photonics Technology Letters, vol. 15, No. 7, Jul. 2003. pp. 921-923.

Niehusmann, et al. "Ultrahigh-quality-factor silicon-on-insulator microring resonator". Optics Letters. vol. 29, No. 24, Dec. 15, 2004. pp. 2861-2863.

Mabuchi, et al. "Atom galleries for whispering atoms: binding atoms in stable orbits around an optical resonator". Optics Letters. vol. 19, No. 10, May 15, 1994. pp. 749-754.

Akahane, et al. "Fine-tuned high-Q photonic-crystal nanocavity". Optics Express. vol. 13. No. 4. Feb. 21, 2005. pp. 1202-1214.

Zadeh, et al. "Free ultra-high-Q microtoriod: a tool for designing photonic devices". Optics Express. vol. 15, No. 1, Jan. 8, 2007. pp. 166-175.

Chao, et al. "Design and Optimization of Microring Resonators in Biochemical Sensing Applications". Journal of Lightwave Technology. vol. 24, No. 3, Mar. 2006. pp. 1395-1402.

Ilchenko, et al. "Nonlinear Optics and Crystalline Whispering Gallery Mode Cavities". Physical Review Letters. vol. 92, No. 4. Jan. 20, 2004. 4 pages.

Srinivasan, et al. "Optical-fiber-based measurement of an ultrasmall volume high-Q photonic crystal microcavity". Physical Review B 70, 081306(R) (2004). 4 pages.

Karmakar, et al. Potential Applications of PBG Engineered Structures in Microwave Engineering: Part I. Technical Feature. Microwave Journal. 2004. pp. 22-44.

Nockel, et al. "Q spoiling and directionality in deformed ring cavities". Optics Letters. vol. 19, No. 21. Nov. 1, 1992. pp. 1693-1695.

Gorodetsky, et al. "Ultimate of optical microsphere resonators". Optics Letters. vol. 21. No. 7, Apr. 1, 1996. pp. 453-455.

International Search Report for International Application No. PCT/US 08/62317. Mailed on Aug. 7, 2008.

Written Opinion of the International Searching Authority for International Application No. PCT/US 08/62317. Mailed on Aug. 7, 2008.

S.H. Kim. "Characteristics of a stick waveguide resonator in a two-dimensional photonic crystal slab". Journal of Applied Physics. vol. 95, No. 2, Jan. 15, 2004. pp. 411-416.

H. Takano, et al. "In-plane-type channel drop filter in a two-dimensional photonic crystal slab". Applied Physics Letters. vol. 84, No. 13. Mar. 29, 2004. pp. 2226-2228.

* cited by examiner

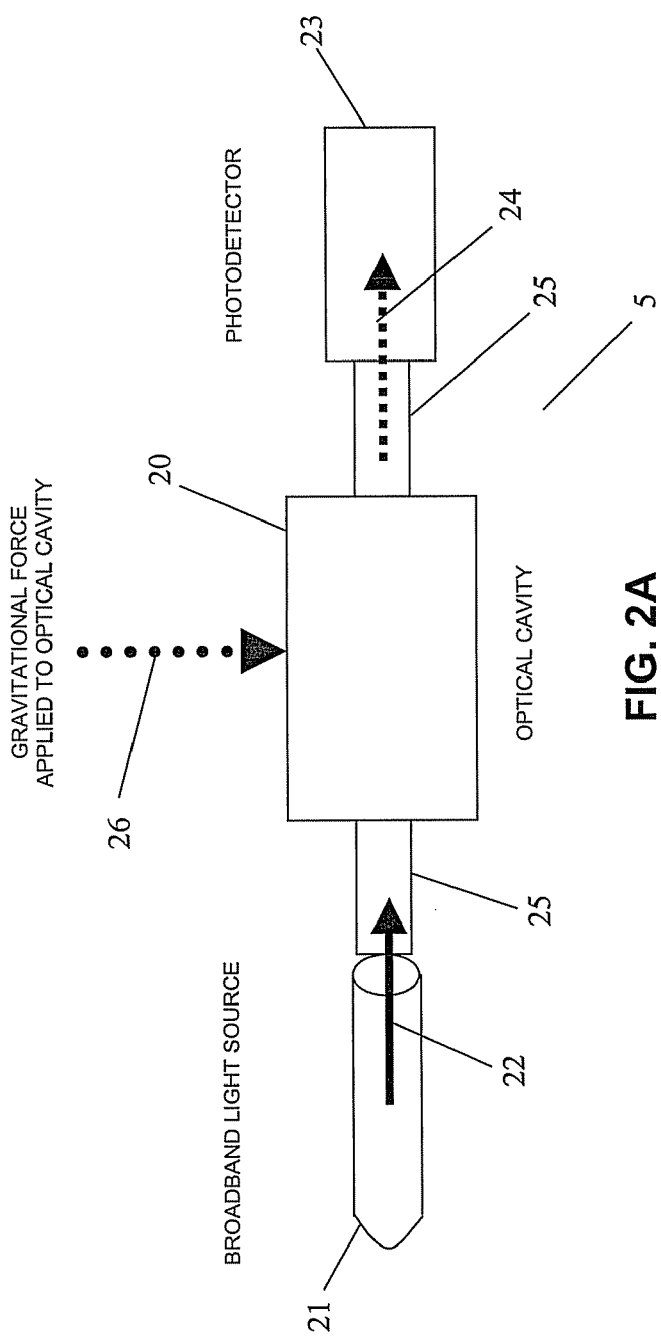
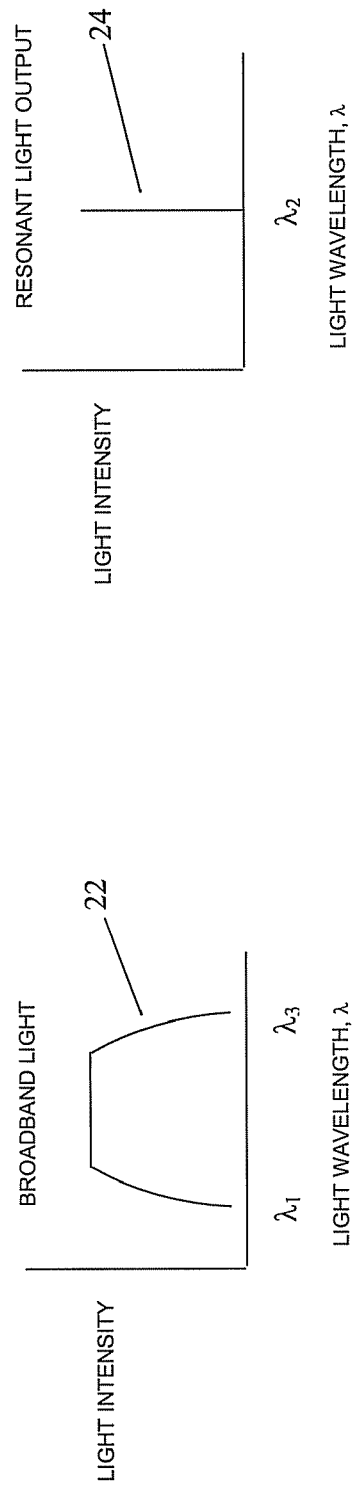

Input Port
Through Port
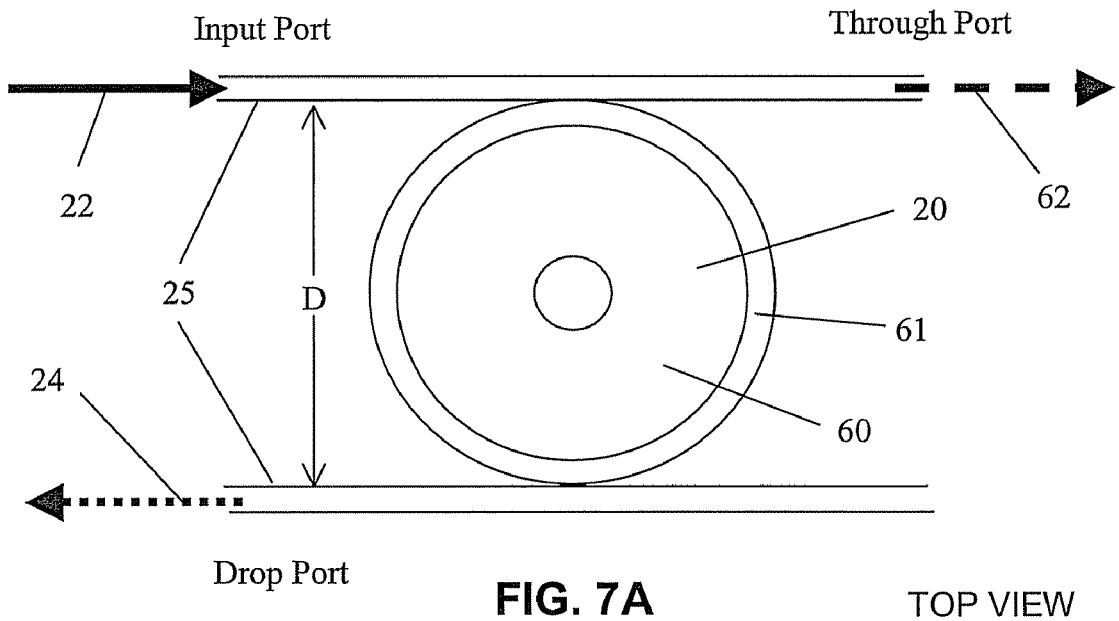
22
25
24
D
20
61
60
62
Drop Port
FIG. 7A   TOP VIEW
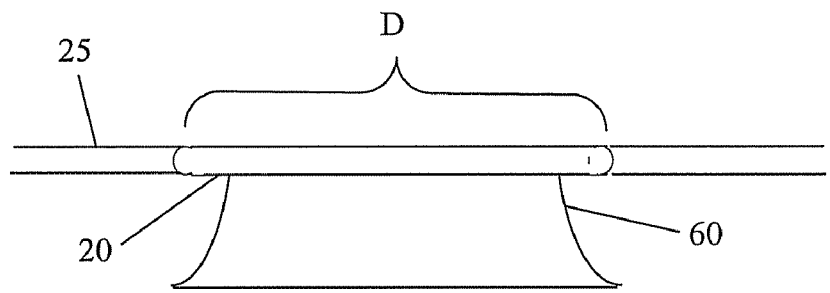
D
25
20
60
FIG. 7B   SIDE VIEW
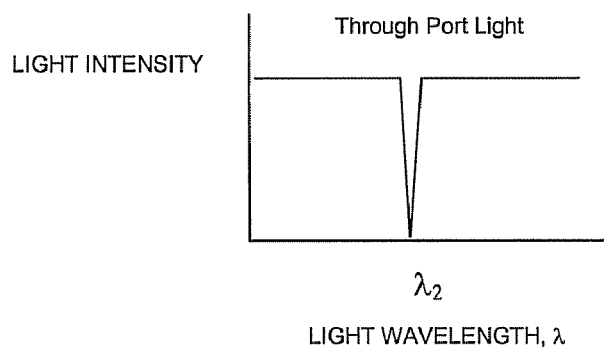
Through Port Light
LIGHT INTENSITY
$\lambda_2$
LIGHT WAVELENGTH, $\lambda$
FIG. 7C

METHOD OF MEASURING BOREHOLE GRAVITATIONAL ACCELERATION

BACKGROUND OF THE INVENTION

1. Field of the Invention

This invention relates to measuring gravitational acceleration. In particular, the measuring is performed within a borehole.

2. Description of the Related Art

In exploration for hydrocarbons, it is important to make accurate measurements of geologic formations. The geologic formations below the surface of the earth may contain reservoirs of oil and gas. The geologic formations may include formation bedding planes and various structures. In a quest for oil and gas, it is important to know about the location and composition of the formation bedding planes and the various structures. In particular, it is important to know about the geologic formations with a high degree of accuracy so that reservoir production is optimized. Measuring properties of the geologic formations provides information that can be useful for locating the reservoirs of oil and gas. Typically, the oil and gas are retrieved by drilling boreholes into the subsurface of the earth. The boreholes also provide access for taking measurements of the geologic formations.

Well logging is a technique used to tale measurements of the geologic formations from the borehole. In one embodiment, a "logging instrument" is lowered on the end of a wireline into the borehole. The logging instrument sends data via the wireline to the surface for recording. Output from the logging instrument comes in various forms and may be referred to as a "log." Many types of measurements are made to obtain information about the geologic formations. Some examples of the measurements include gamma ray logs, nuclear magnetic resonance logs, resistivity logs, and sonic or acoustic logs.

Knowledge of many parameters is useful in well logging. For example, having knowledge of depth of the borehole at various points as well as amounts of injection media contained within the reservoirs provides useful information. Depth of the logging instrument in the borehole can be used to determine the depth of the formation bedding planes.

Typically, a common factor among the logs is that a borehole depth is associated with the measurements. For example, each time a resistivity measurement is made, the measurement is associated with the borehole depth at which the measurement was made. In general, many logs of various measurements are analyzed to male an accurate assessment of the geologic formations. The various measurements may be viewed side-by-side to form a composite picture of the geologic formations. Therefore, it is important to have accurate knowledge of the borehole depth and orientation of the logging tool when each measurement is taken.

The orientation of the logging tool is typically with respect to a vertical axis and magnetic north. Even small errors in the borehole depth determination can corrupt logging data. An assumption that the logging instrument is moving smoothly through the borehole is not always valid due to rugose and sticky borehole conditions. Additionally, tool centralizers and decentralizers may keep the logging tool from moving smoothly. Horizontal deviations of the borehole may also lead to errors in measuring the borehole depth. Generally, the horizontal deviations are not relevant to a "true vertical depth." It is, therefore, important to have reliable techniques for determining the true vertical depth of the logging instrument. In addition to realizing benefits from knowledge of the true vertical depth, accurately assessing status of injection media provides a number of benefits.

An important parameter when recovering oil and gas is an amount remaining in the formation. When the oil and gas recovered using traditional methods start to decrease, injection media such as water or carbon dioxide may be used to enhance recovery. That is, at least one of the water and carbon dioxide are typically injected into the reservoirs. The injection media contribute to forcing the remaining hydrocarbons out of the reservoirs. It is important to measure amounts of the injection media in the reservoirs so that the amounts can be used to determine the amount of remaining hydrocarbons.

Information regarding these and other parameters may be derived from local measurements of gravity. Therefore, accurate techniques for measuring gravity are desired.

What are needed are reliable and accurate techniques for measuring gravity.

BRIEF SUMMARY OF THE INVENTION

The shortcomings of the prior art are overcome and additional advantages are provided through a sensor adapted for measuring acceleration, the sensor including a light source for illuminating an optical cavity; the optical cavity oriented for receiving light from the source, the optical cavity comprising a quality factor greater than or equal to about 10,000; and a photodetector for measuring a resonant frequency of light emitted from the optical cavity.

Also disclosed is a method for measuring at least one of acceleration and gravitational acceleration, the method including taking a first measurement of a resonant frequency of an optical cavity; taking a second measurement of the resonant frequency of the optical cavity; and comparing the first measurement to the second measurement to determine the at least one of acceleration and gravitational acceleration.

Also disclosed is a computer program product stored on machine-readable media, the product includes instructions for measuring at least one of acceleration and gravitational acceleration, the instructions including instructions for talking a first measurement of a resonant frequency of an optical cavity; talking a second measurement of the resonant frequency of the optical cavity; and comparing the first measurement to the second measurement to determine the at least one of acceleration and gravitational acceleration.

Further disclosed is a method for producing a logging instrument adapted for measuring acceleration in a borehole, the method including selecting at least one sensor comprising a light source, an optical cavity, and a photodetector, wherein the optical cavity comprises a quality factor greater than or equal to 10,000; and placing the sensor into the instrument.

BRIEF DESCRIPTION OF THE DRAWINGS

Referring now to the drawings wherein like elements are numbered alike in the several Figures:

FIGS. 2A, 2B, and 2C, collectively referred to as FIG. 2, illustrate exemplary aspects of a gravimeter;

FIGS. 7A, 7B, and 7C, collectively referred to as FIG. 7, illustrate an exemplary embodiment of a microring optical cavity;

DETAILED DESCRIPTION OF THE INVENTION

The teachings provide for performing measurements downhole using a gravitational accelerometer. The gravitational accelerometer may also be referred to as a "gravimeter" or a "sensor." Gravitational acceleration measured can be correlated to a variety of parameters such as a "true vertical depth" (TVD) of a borehole.

Figure 1:
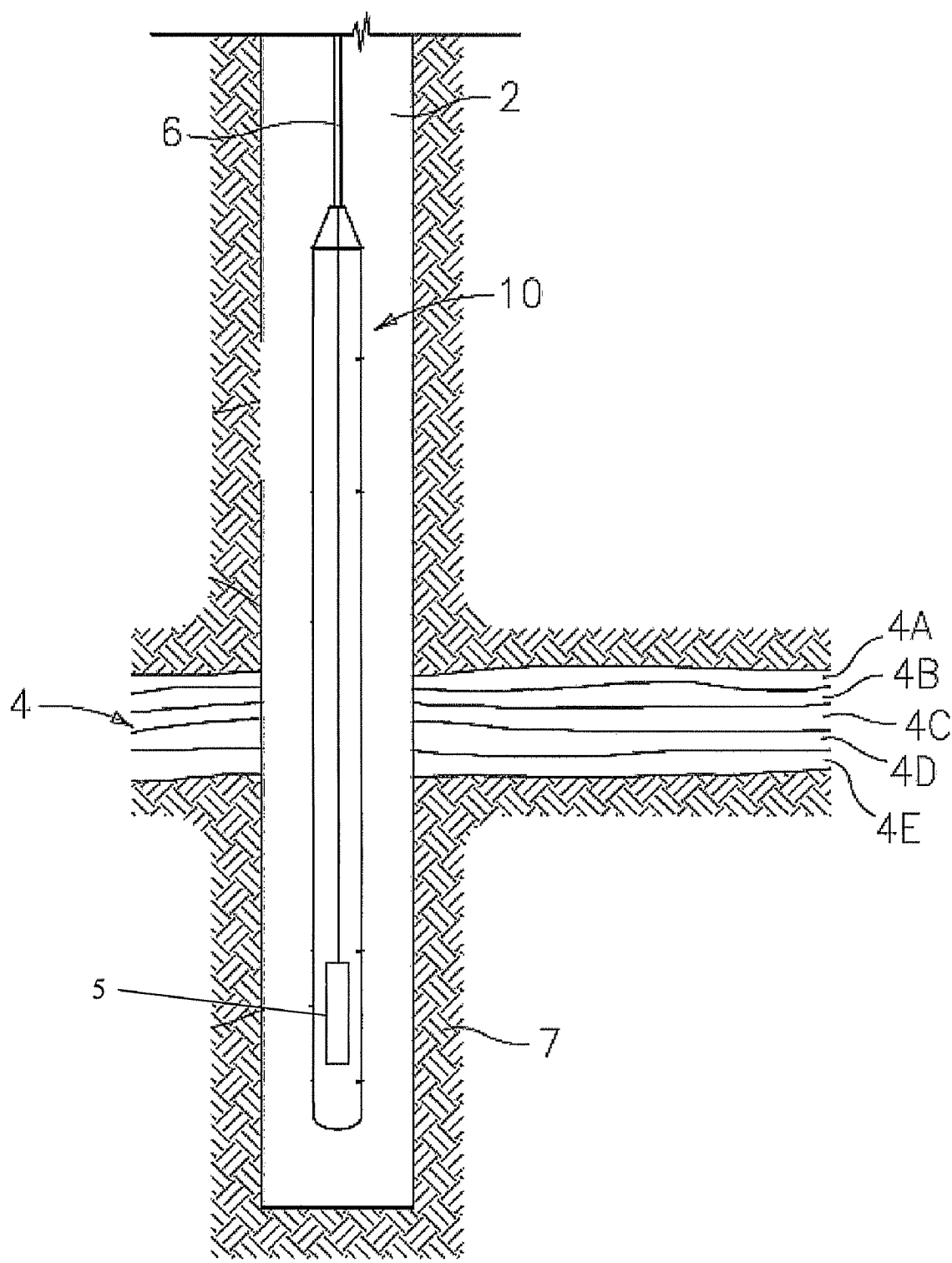
FIG. 1 illustrates an exemplary embodiment of a logging instrument in a borehole penetrating the earth.

Referring to FIG. 1, a well logging instrument 10 is shown disposed in a borehole 2. The borehole 2 is drilled through earth 7 and penetrates formations 4, which include various formation bedding planes 4A-4E. The logging instrument 10 is typically lowered into and withdrawn from the borehole 2 by use of an armored electrical cable 6 or similar conveyance as is known in the art. A gravimeter 5 is shown disposed within the logging instrument 10.

In typical embodiments, the borehole 2 includes materials such as would be found in oil exploration, including a mixture of liquids such as water, drilling fluid, mud, oil and formation fluids that are indigenous to the various formations. One skilled in the art will recognize that the various features as may be encountered in a subsurface environment may be referred to as "formations." Accordingly, it should be considered that while the term "formation" generally refers to geologic formations of interest, that the term "formations," as used herein, may, in some instances, include any geologic points of interest (such as a survey area).

For the purposes of this discussion, it is assumed that the borehole 2 is vertical and that the formations 4 are horizontal. The gravimeter however can be applied equally well in deviated or horizontal wells or with the formation bedding planes 4A-4E at any arbitrary angle. The gravimeter is equally suited for use in LWD applications and in open-borehole and cased-borehole wireline applications. In LWD applications, the apparatus may be disposed in a drilling collar. Typically, in LWD applications, the gravimeter is de-activated while a drill bit is turning. Accuracy of measurements taken while the drill bit is turning may be significantly reduced due to vibrations. The gravimeter may be activated to measure the gravitational acceleration while the drill bit is temporarily stopped.

The natural laws of physics dictate that the gravitational acceleration at a location is determined by various factors. Such factors include a size and an orientation of masses surrounding the location. A direction and a distance describe orientation of each mass relative to the location. In the downhole environment, gravitational acceleration includes contributions from masses of the geologic formations. It is known that gravity varies with depth. As one might imagine, as the logging instrument 10 moves down the borehole, orientation of the logging instrument 10 varies with respect to the formations 4. The gravitational acceleration varies due to the variations in the orientation. The gravimeter 5 measures the gravitational acceleration at selected points along the borehole 2. Therefore, the gravimeter 5 provides for determining orientation of the logging instrument 10.

Generally, output of the gravimeter 5 is correlated to the borehole depth. The output is referred to as the true vertical depth because the gravitational acceleration typically does not vary with horizontal deviations of the borehole or stretching of the wireline. By measuring the true vertical depth, the gravitational accelerometer can account for the horizontal deviations and the logging instrument not moving smoothly through the borehole.

Additionally, the gravimeter 5 may be used to monitor injection media stored in the reservoirs to enhance recovery of the hydrocarbons. For example, the gravimeter 5 can measure changes in gravitational acceleration due to the mass of injected water and/or carbon dioxide.

Typically, a bulk density of the geologic formation is used to correlate the gravitational acceleration with the TVD. There are several ways to determine the bulk density. One way is to assume an average based upon known geologic data in a region adjacent to the borehole. Another way is to measure porosity of the formation using a nuclear magnetic resonance logging tool for example. Knowing the porosity, the bulk density can be computed using 2.67 gm/cc as an average grain density.

The teachings provide for the gravimeter 5 based on an optical cavity. The optical cavity resonates light of a particular frequency for a period of time. The frequency at which the light resonates is dependent on optical parameters of the optical cavity. A change in gravitational force, associated with a change in the gravitational acceleration, imposed upon the optical cavity can change the optical parameters of the optical cavity. Changing the optical parameters results in a shift of the frequency at which the light resonates (referred to as a resonant frequency). The change in gravitational force is related to the shift in the resonant frequency. The change in gravitational acceleration can be determined because the change in gravitational acceleration is related to the change in the gravitational force. Before the gravimeter 5 is discussed in detail, certain definitions are provided.

The term "optical cavity" or "optical resonator" relates to a device that can contain light of a certain frequency for a period of time. Typically, the light is contained by being reflected by reflective surfaces internal to the optical cavity. Only a certain frequency or frequencies of light are contained within the optical resonator while other frequencies are suppressed by effects such as destructive interference. The terms "Q" and "quality-factor" relate to a ratio of energy stored in the optical resonator to the energy lost in one cycle. In general, an optical resonator with a high quality factor, Q, has a higher sensitivity to changes in optical parameters than an optical resonator with a low quality factor, Q. The term "evanescent wave coupling" relates to a process by which electromagnetic waves are transmitted from one medium to another by means of evanescent (or decaying) electromagnetic field(s). This is usually accomplished by placing two or more waveguides close together so that the evanescent field does not decay much in the vicinity of the other waveguide. Assuming the receiving waveguide can support mode(s) of the appropriate frequency, the evanescent field gives rise to propagating wave mode(s), thereby connecting (or coupling) the wave from one waveguide to the next. The term "single mode" relates to the transmission of a single ray (a narrow band of the optical spectrum) of light. Typically, single mode transmission does not exhibit dispersion resulting from multiple spatial modes. The term "absolute standard" relates to a reference standard that is calibrated to absolute gravitational acceleration. The term "proof mass" relates to a known mass upon which a force acting can be measured.

In order to measure gravitational acceleration in a downhole environment, the gravimeter 5 must exhibit a high degree of sensitivity. The gravimeter 5 disclosed herein for downhole use has a resolution typically on the order of parts per billion. Generally, to achieve parts per billion resolution, the optical cavity has a quality factor, Q, on the order of $10^8$. The high quality factor characterizes that light will reflect in the optical cavity for a high number of cycles. Because each cycle presents an opportunity for recognizing a change in the resonant frequency, the high quality factor, Q, reflects that the gravimeter 5 has a high resolution.

FIG. 2 illustrates exemplary aspects of the gravimeter 5. Referring to FIG. 2A, a broadband light source 21 provides broadband light 22 to an optical cavity 20. An exemplary embodiment of the broadband light source 22 is a laser. The broadband light source 21 is coupled to the optical cavity 20 via a waveguide 25. The optical cavity 20 resonates a certain wavelength (at a corresponding resonant frequency) of the broadband light 22. A resonant light output 24 exits the optical cavity 20 at the resonant frequency. A photodetector 23 detects the resonant frequency of the resonant light output 24. Typically, the photodetector 23 includes a spectrum analyzer. The photodetector 23 is coupled to the optical cavity 20 by the waveguide 25. The resonant frequency is determined by optical parameters of the optical cavity 20. One example of an optical parameter includes geometry of the optical cavity 20. FIG. 2B is an exemplary graph of intensity versus wavelength for the broadband light 22. Referring to FIG. 2B, the broadband light 22 includes wavelengths from $\lambda_1$ to $\lambda_3$. FIG. 2C is an exemplary graph of the resonant light output 24. Referring to FIG. 2C, the resonant light output 24 has a resonance at the resonant frequency, $\lambda_2$.

Referring to FIG. 2A, an influence on the optical parameters is a gravitational force 26. The gravitational force 26 is related to the gravitational acceleration at the optical cavity 20. If the gravimeter 5 moves to a different location where the gravitational acceleration is different, then the gravitational force 26 applied to the optical cavity 20 will also change. A result of the change in the gravitational force 26 is that the optical parameters will change and, therefore, the resonant frequency, $\lambda_2$, will change. For example, the change in the gravitational force 26 may change a flexure of the optical cavity 20. The change in the resonant frequency, $\lambda_2$, can be correlated to the change in gravitational acceleration.

Figure 3:
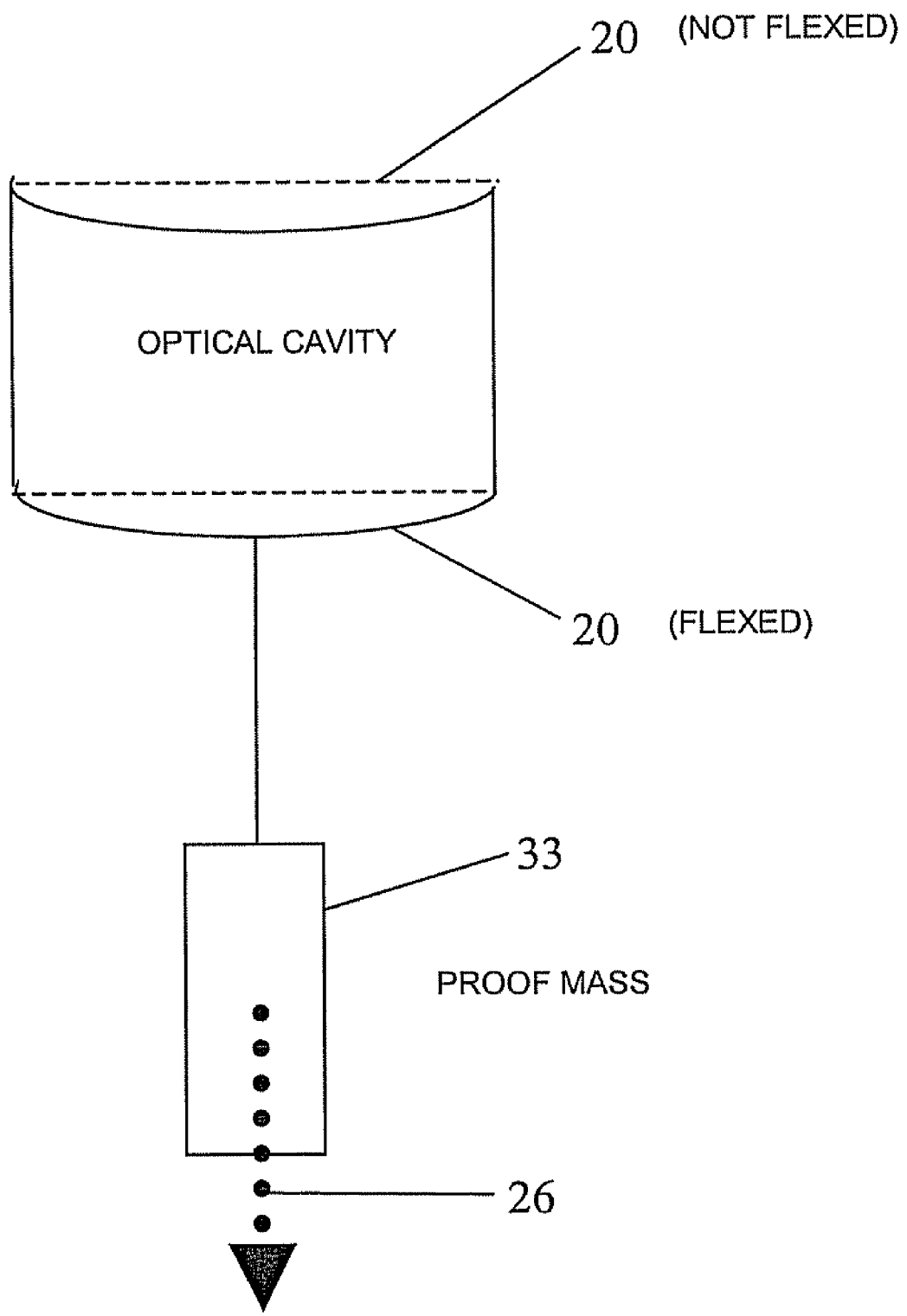
FIG. 3 illustrates an exemplary embodiment of an optical cavity connected to a proof mass.

The gravitational force 26 acting alone upon the optical cavity 20 may not be sufficient to flex the optical cavity 20. The optical cavity 20 will not respond directly to a change in the zero hertz frequency component of gravitational acceleration but only to oscillations with frequencies greater than zero hertz. Typically, to flex the optical cavity 20, a proof mass is connected to the optical cavity 20. The gravitational force 26 acting upon the proof mass provides sufficient force to flex the optical cavity 20. The proof mass may be connected to the optical cavity 20 by at least one of a flexible connection such as a string and a rigid connection such as a lever. A connection between the proof mass and the optical cavity 20 may provide for mechanically amplifying the gravitational force 26. The gravitational force 26 acting upon the proof mass is related to the gravitational acceleration at the proof mass 30. Therefore, by measuring the gravitational force 26 acting upon the proof mass, the gravimeter 5 can measure the gravitational acceleration at the gravimeter 5. FIG. 3 illustrates an exemplary embodiment of a proof mass 33 connected to the optical cavity 20. Referring to FIG. 3, the optical cavity 20 that is flexed by the gravitational force 26 acting upon the proof mass 33 is depicted with solid lines while the optical cavity 20 that is not flexed is depicted with dashed lines.

Several embodiments of optical resonators are known. One class of embodiments with a quality factor, Q, high enough to measure gravitational acceleration is solid-state. The optical cavities 20 fabricated using solid-state technology may be of a nano-scale size. There are several benefits to fabricating the optical cavities 20 with solid-state technology. Among these, the optical cavity 20 can have a high quality factor, Q, that relates to high sensitivity. The solid-state optical cavity 20 can have a small nano-scale volume to ensure a single mode of operation for a broad range of wavelengths, $\lambda$. A small cavity size enables large-scale integration. Finally, a high Q to volume ratio ensures a high strength of interaction between light and matter within the optical cavity 20.

Some embodiments of the optical resonators are manufactured with techniques, such as photolithography, known in the solid-state arts.

Figure 4:
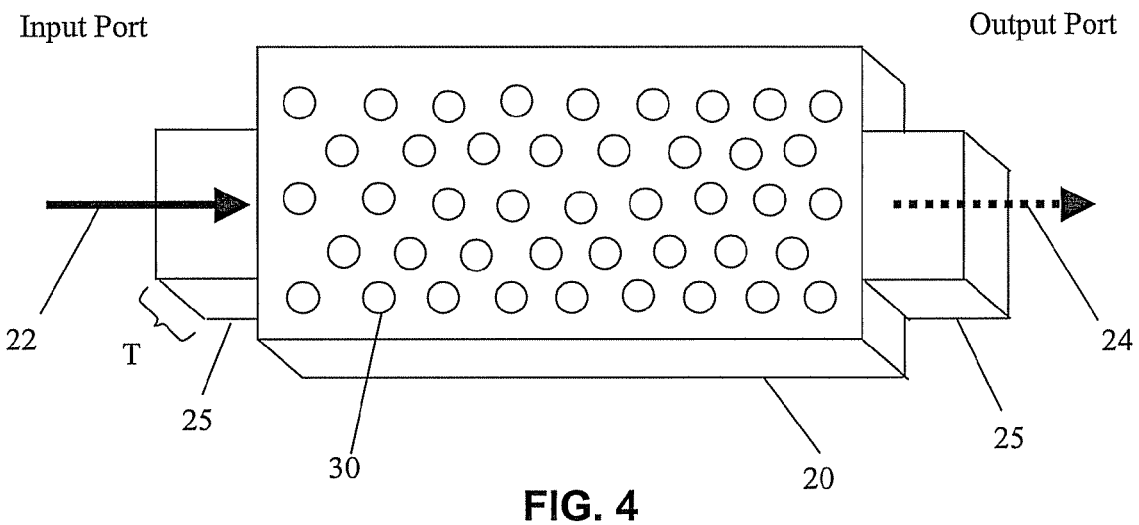
FIG. 4 illustrates an exemplary embodiment of a photonic crystal.

The optical cavity 20 in the solid-state may be based on a photonic crystal. FIG. 4 illustrates an exemplary embodiment of a photonic crystal 30. Referring to FIG. 4, the photonic crystal 30 may be two-dimensional in that light is confined to a plane or three-dimensional. For teaching purposes, the discussion herein is focused on two-dimensional photonic crystals. The photonic crystal 30 is a structure made from a dielectric material having a dielectric constant. An exemplary embodiment of the dielectric material is silicon. The structure for silicon contains periodic changes of the dielectric constant. The majority of the periodic changes typically occur in a pattern. Distances at which the periodic changes occur are of the order of the wavelength of light. A thickness "T" of the photonic crystal 30 is also on the order of the wavelength of light. Light is prevented from escaping in directions normal to the plane by a total-internal-reflection at an interface between the photonic crystal and a cladding layer. The broadband light 22 enters a side of the photonic crystal 30. With an appropriate pattern of periodic changes of the dielectric constant, the photonic crystal will act as a filter allowing the resonant light output 24 to exit on another side.

A change in the gravitational force 26 acting on the photonic crystal 30 will cause a change to the pattern of the periodic changes of the dielectric constant. The change in the pattern will in turn cause a change in the resonant frequency, $\lambda_2$, of the photonic crystal 30. The change in the gravitational force 26 can be determined from the change in the resonant frequency, $\lambda_2$. Also, a change in the gravitational acceleration can be determined from the change in the gravitational force 26.

Referring to FIG. 4, the periodic changes of the dielectric constant may be caused by air holes 31 fabricated in the photonic crystal. The air holes are generally normal to the plane of the photonic crystal 30. Typically, the air holes 31 are placed in a triangular-lattice pattern. A diameter of the air hole 31 and a distance between the air holes 31 are selected to provide an appropriate resonant frequency, $\lambda_2$, for measuring changes in the gravitational acceleration. The quality factor, Q, of the photonic crystal 30 may be increased by introducing a defect to the pattern. Typically, the defect occurs towards the center of the photonic crystal 30. The defect may include at least one of a change in spacing between the air holes 31 and some air holes 31 being deleted from the pattern.

Referring to FIG. 4, light enters and exits the photonic crystal 30 via the waveguides 25. An example of the waveguide 25 is an optical fiber.

Figure 5:
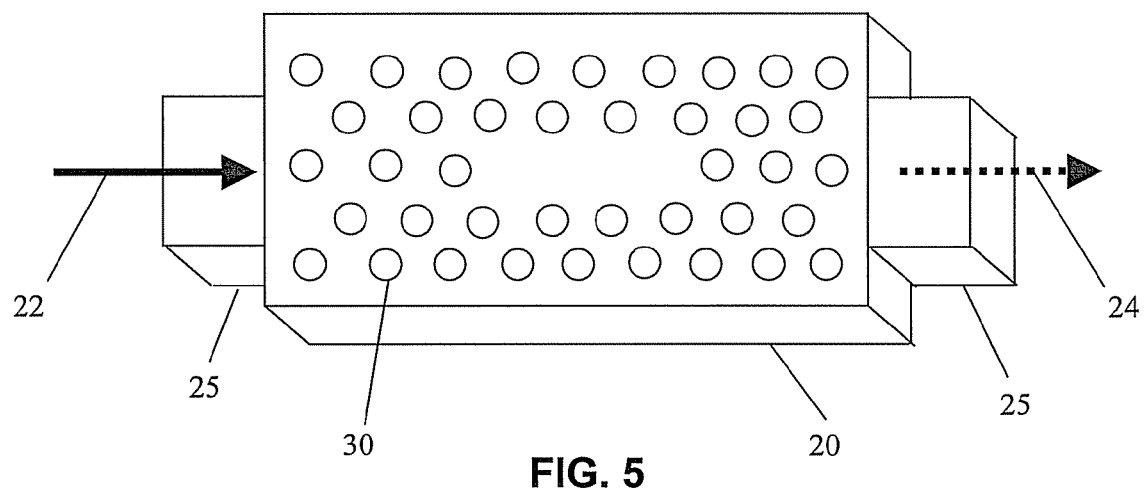
FIG. 5 illustrates an exemplary embodiment of a photonic crystal with a line defect.

FIG. 5 illustrates an exemplary embodiment of the photonic crystal 30 with a pattern defect in a center region of the photonic crystal 30. In this embodiment, several of the air holes 31 are deleted in the center region.

Figure 6:
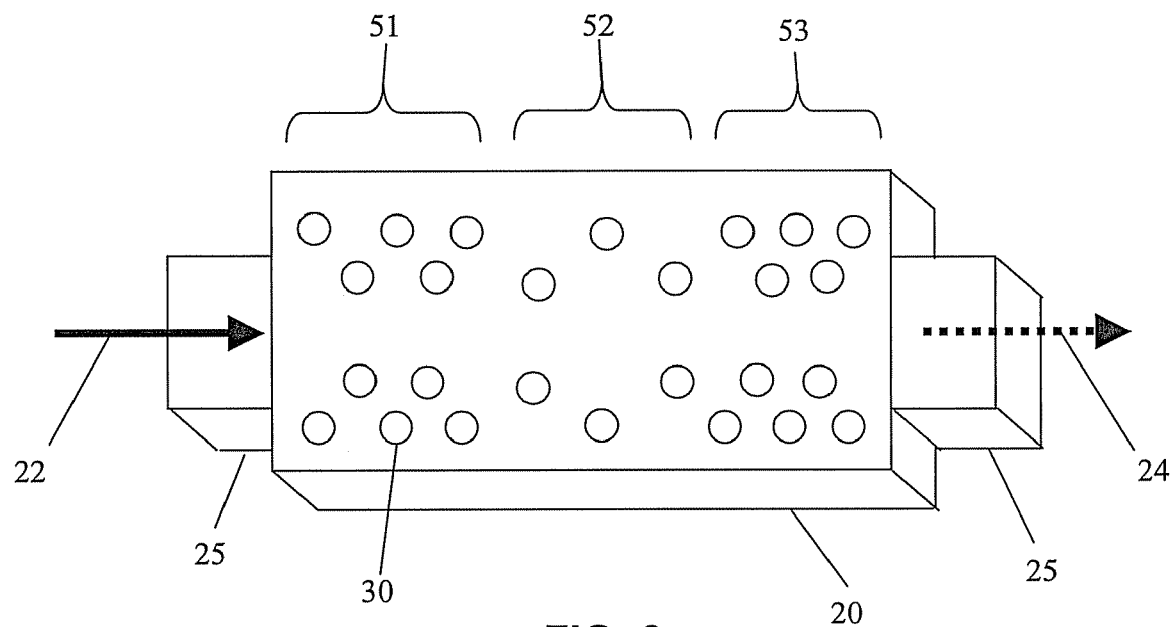
FIG. 6 illustrates an exemplary embodiment of a photonic double heterostructure.

FIG. 6 illustrates an exemplary embodiment of the photonic crystal 30 with another pattern defect. Referring to FIG. 6, the photonic crystal 30 includes a "line-defect waveguide." The line-defect waveguide is formed by alternating patterns of the air holes 31 in three regions of the photonic crystal 30. The three regions are labeled, referring to FIG. 6, a first region 51, a second region 52, and a third region 53. The spacing between the air holes 31 in the first region 51 and the third region 53 is the same. The spacing between the air holes 31 in the second region 52 is different from the spacing in the first region 51 and the third region 53. The line-defect waveguide provides for a high quality factor, Q, and the resonant light output 24 with a narrow frequency bandwidth. The photonic crystals 30 with the line-defect waveguide are typically referred to as "photonic double heterostructures."

Another embodiment of the optical cavity 20 is referred to as a "microring." FIG. 7 illustrates an exemplary embodiment of a microring 60. The nicroring 60 includes an optical toroid 61. Referring to FIG. 7A, light circulates around the optical toroid 61. Light is confined in the optical toroid 61 by total-internal-reflection by the walls of the optical toroid 61. Referring to FIG. 7B, typically, the diameter "D" of the optical toroid 61 can be on the order of 60 μm or smaller. Operation of the microring with continuous circulation of light is referred to as "whispering gallery mode." In the whispering gallery mode, the microring 60 may have a quality factor, Q, on the order of $10^8$ or greater. As with other optical cavities 20, light will resonate at a frequency, $\lambda_2$, depending on the optical parameters of the optical toroid 61. A change in the gravitational force 26 acting upon the optical toroid 61 will cause the resonant frequency, $\lambda_2$, to change. The change in the gravitational force 26 can be determined from the change in the resonant frequency, $\lambda_2$. Also, a change in the gravitational acceleration can be determined from the change in the gravitational force 26. An exemplary embodiment of the microring 60 may be fabricated from at least one of a polymer and a silicon-on-insulator substrate. Typically, the waveguide 25 is used with the microring 60.

Referring to FIG. 7A, the broadband light 22 enters the waveguide 25. A portion of the broadband light 22 will enter the optical toroid 61 via evanescent wave coupling. Light within the optical toroid 61 will resonate at the resonant frequency, $\lambda_2$. A portion of the light resonating within the optical toroid 61 will exit the optical toroid 61 as the resonant light output 24 via another waveguide 25. One exemplary embodiment of the waveguide 25 for use with the microring 60 is a tapered optical fiber.

Figure 8:
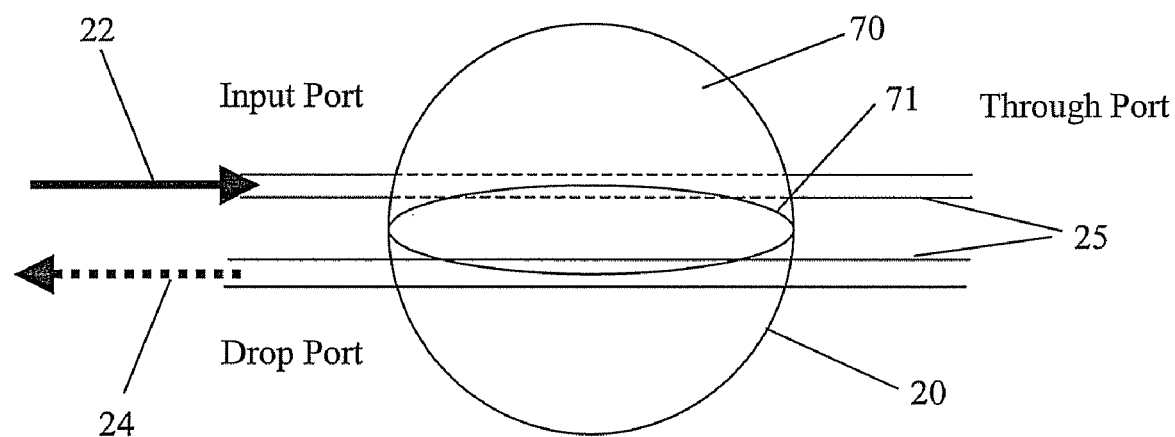
FIG. 8 illustrates an exemplary embodiment of a microsphere optical cavity.

Another embodiment of the optical cavity 20 using the whispering gallery mode is referred to as a "microsphere." FIG. 8 illustrates an exemplary embodiment of a microsphere 70. In the whispering gallery mode, light circulates in a thin annular region inside the surface of the microsphere 70. Referring to FIG. 8, the thin annular region is near an equator 71 of the microsphere 70. The diameter of the microsphere 70 can be on the order of 20 μm or smaller. The microsphere 70 can have a quality factor, Q, on the order of $10^9$ or greater. An exemplary embodiment of the microsphere 70 is fabricated from fused silica.

As with the microring 60, light in the microsphere 70 will resonate at a resonant frequency, $\lambda_2$, depending on the optical parameters of the microsphere 70. A change in the gravitational force 26 acting upon the microsphere 70 will cause the optical parameters to change with a resulting change in the resonant frequency, $\lambda_2$. As discussed above, the change in the gravitational force 26 and the change in the gravitational acceleration can be determined from the change in the resonant frequency, $\lambda_2$.

The tapered optical fiber is typically used as the waveguide 25 in conjunction with the microsphere 70. The tapered optical fiber is coupled to a side of the microsphere 70 by evanescent wave coupling.

Typically, the well logging instrument 10 includes adaptations as may be necessary to provide for operation during drilling or after a drilling process has been undertaken.

Figure 9:
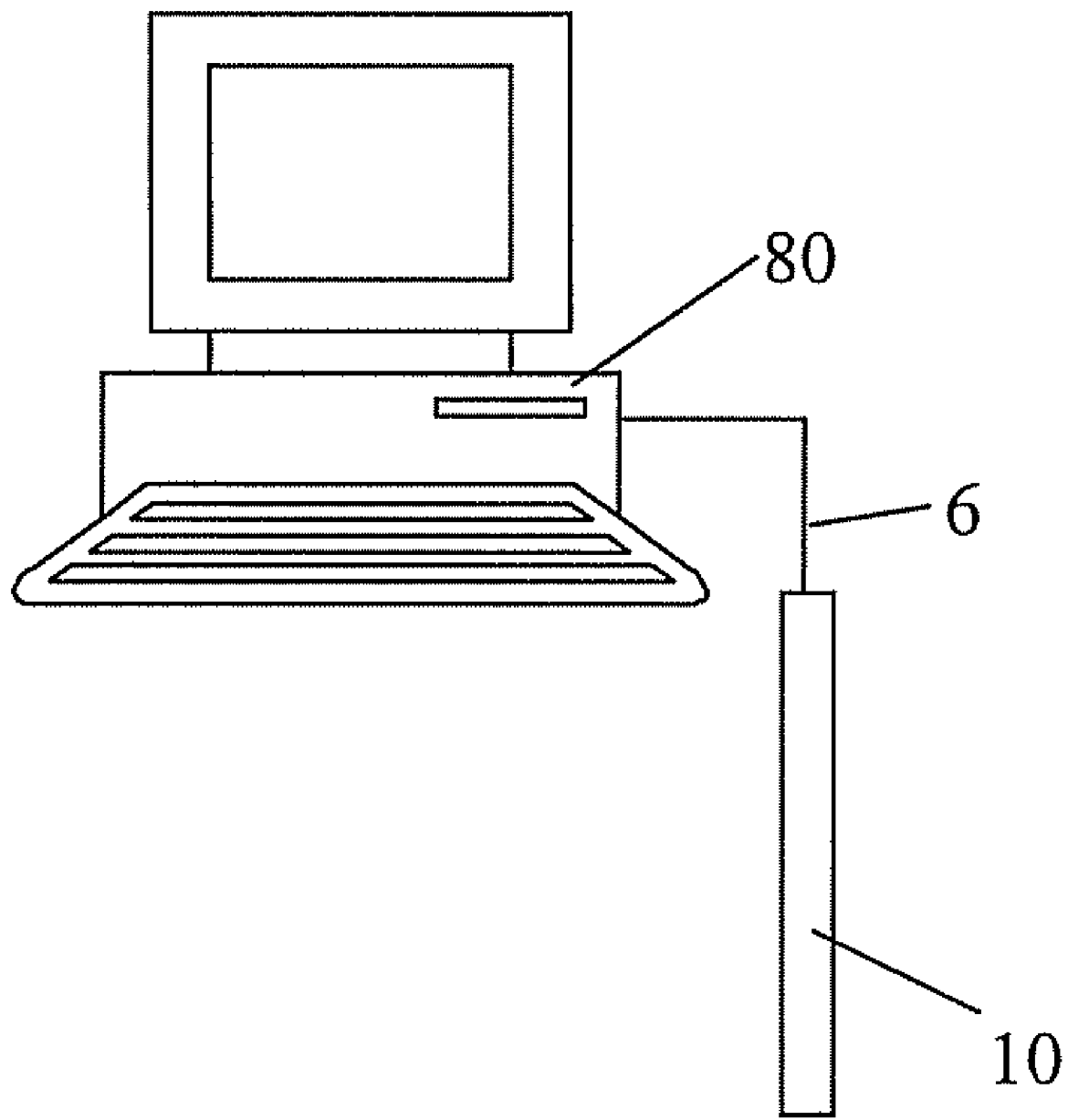
FIG. 9 illustrates an exemplary embodiment of the logging instrument connected to a computer.

Referring to FIG. 9, an apparatus for implementing the teachings herein is depicted. In FIG. 9, the apparatus includes a computer 80 coupled to the well logging instrument 10. Typically, the computer 80 includes components as necessary to provide for the real time processing of data from the well logging instrument 10. Exemplary components include, without limitation, at least one processor, storage, memory, input devices, output devices and the like. As these components are known to those skilled in the art, these are neither depicted in any detail nor discussed further herein.

Typically, the teachings herein are reduced to an algorithm that is stored on machine-readable media. The algorithm is implemented by the computer 80 and provides operators with desired output. The output is typically generated on a real-time basis.

The gravimeter 5 may be used to provide real-time measurements of gravitational acceleration. As used herein, generation of data in "real-time" is taken to mean generation of data at a rate that is useful or adequate for making decisions during or concurrent with processes such as production, experimentation, verification, and other types of surveys or uses as may be opted for by a user or operator. As a non-limiting example, real-time measurements and calculations may provide users with information necessary to make desired adjustments during the drilling process. In one embodiment, adjustments are enabled on a continuous basis (at the rate of drilling), while in another embodiment, adjustments may require periodic cessation of drilling for assessment of data. Accordingly, it should be recognized that "real-time" is to be taken in context, and does not necessarily indicate the instantaneous determination of data, or make any other suggestions about the temporal frequency of data collection and determination.

A high degree of quality control over the data may be realized during implementation of the teachings herein. For example, quality control may be achieved through known techniques of iterative processing and data comparison. Accordingly, it is contemplated that additional correction factors and other aspects for real-time processing may be used. Advantageously, the user may apply a desired quality control tolerance to the data, and thus draw a balance between rapidity of determination of the data and a degree of quality in the data.

Figure 10:
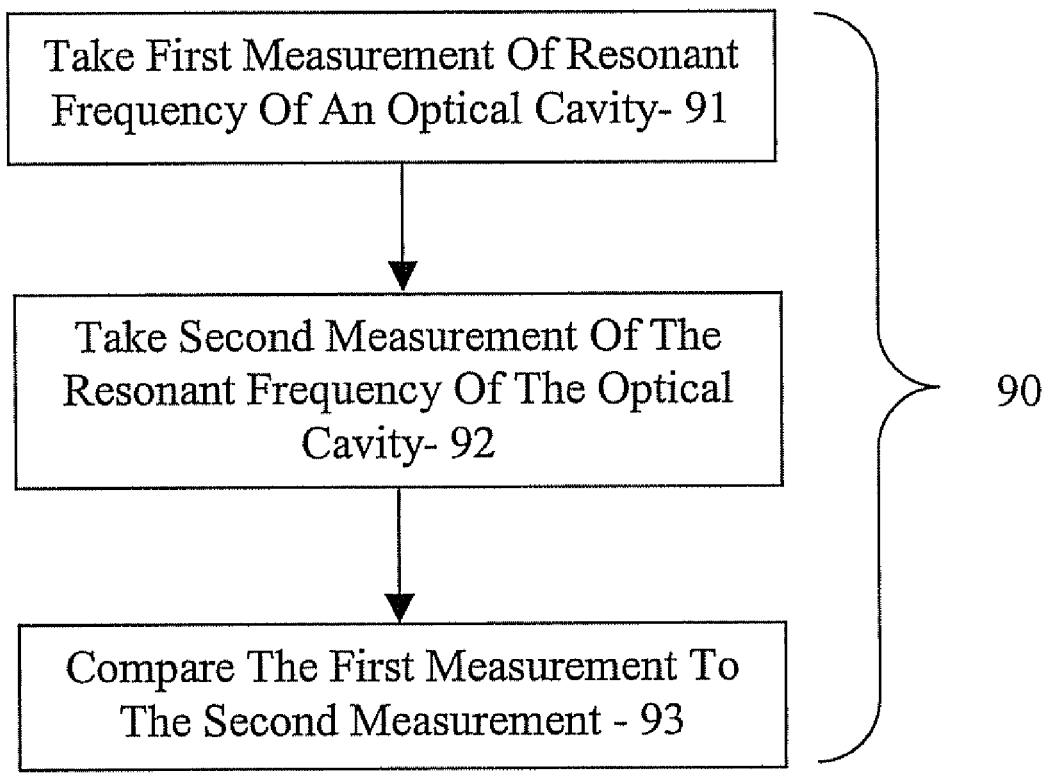
FIG. 10 illustrates an exemplary method for measuring gravitational acceleration.

FIG. 10 presents an exemplary method 90 for measuring gravitational acceleration in the borehole 2. The method 90 calls for using the gravimeter 5 incorporating the optical cavity 20. A first step 91 calls for taking a first measurement of the resonant frequency of the optical cavity 20. Typically, the first measurement is a reference measurement against which other measurements of gravitational acceleration are compared. If the reference measurement is calibrated to a standard of gravitational acceleration, then subsequent measurements may be referenced to the standard of gravitational acceleration. If the standard is an absolute standard, then the subsequent measurements will provide "absolute gravitational acceleration." The reference measurement in the first step 91 may be with respect to a known TVD of the borehole 2 at a reference point. A second step 92 calls for talking a second measurement of the resonant frequency of the optical cavity 20. The second step 92 may be performed at a location different from where the first step 91 was performed or at the same location. For example, the second step 92 may be performed deeper in the borehole 2 from where the first step 91 was performed. As another example, the second step 92 may be performed at the same location where the first step 91 was performed but at a later time. A third step 93 calls for comparing the measurement from the first step 91 to the measurement from the second step 92. The TVD at a location in the borehole 2 may be determined by at least one of determining the absolute gravitational acceleration at the location and relating a change in gravitational acceleration to a difference in depth from the known TVD at the reference point discussed above. When the first step 91 and the second step 92 are performed at the same location, then the third step 93 may be used to monitor the hydrocarbon reservoirs after the injection of injection media such as at least one of water and carbon dioxide.

The discussion above concerning the optical cavities 20 is with respect to the exemplary embodiments presented. For example, FIG. 4 illustrates a two-port configuration and FIG. 7 and 8 illustrate four-port configurations. The optical cavities 20 may be used in the gravimeters 5 in configurations with any number of ports. Referring to FIG. 7 and 8, light emitted from through ports, for example, may be analyzed for resonance changes (or shifts). For example, referring to FIG. 7A, through port light 62 exits the through port and may be analyzed for resonance shifts. FIG. 7C illustrates an exemplary spectrum of the through port light 62. Referring to FIG. 7C, the spectrum includes a decrease in intensity at the resonant frequency $\lambda_2$.

In certain embodiments, the gravimeter 5 may be disposed in more than one logging instrument 10. In these embodiments the responses from the gravimeters 5 may be combined to produce a composite response. Using multiple instruments 10 to produce the composite response is considered inherent to the teachings herein and a part of the invention disclosed.

The gravimeter 5 may be used to measure relative gravitational acceleration and absolute gravitational acceleration. Measurement of relative gravitational acceleration involves comparing the resonant frequency, $\lambda_2$, of the optical cavity 20 from two measurements. The relative gravitational acceleration relates to a change in the resonant frequency, $\lambda_2$, with respect to a previous measurement of gravitational acceleration. Measurement of absolute gravitational acceleration involves calibrating the gravimeter 5 to an absolute standard of gravitational acceleration to provide a calibration point. The calibration involves correlating the absolute standard to the resonant frequency, $\lambda_2$, of the optical cavity 20. The absolute gravitational acceleration at a different location can then be measured by determining a difference in the resonant frequency, $\lambda_2$, from the calibration point.

Besides measuring gravitational acceleration, the gravimeter 5 (or sensor 5) may be used to measure acceleration that the sensor 5 may undergo. In embodiments of the sensor 5 used as an accelerometer, the proof mass 33 may not be required. A force of acceleration imposed upon the optical cavity 20 may be of a sufficient magnitude to cause the optical cavity 20 to flex. One example of acceleration that the sensor 5 can measure is a vibration. The optical cavity can measure the amplitude and frequency of the vibration.

The sensor 5 may be built for measuring accelerations that are at least one of direction independent and specific to certain axes. The optical cavity 20 may be designed to measure acceleration in one, two or three axes. For example, the microring 60 can measure acceleration in two axes that are planar with the optical toroid 61. Different combinations of the optical cavity 20 may be incorporated into the sensor 5. For example, the sensor 5 can measure acceleration in three axes by employing one optical cavity 20 for measuring acceleration in planar directions and one optical cavity 20 for measuring acceleration in one dimension orthogonal to the planar directions.

Figure 11:
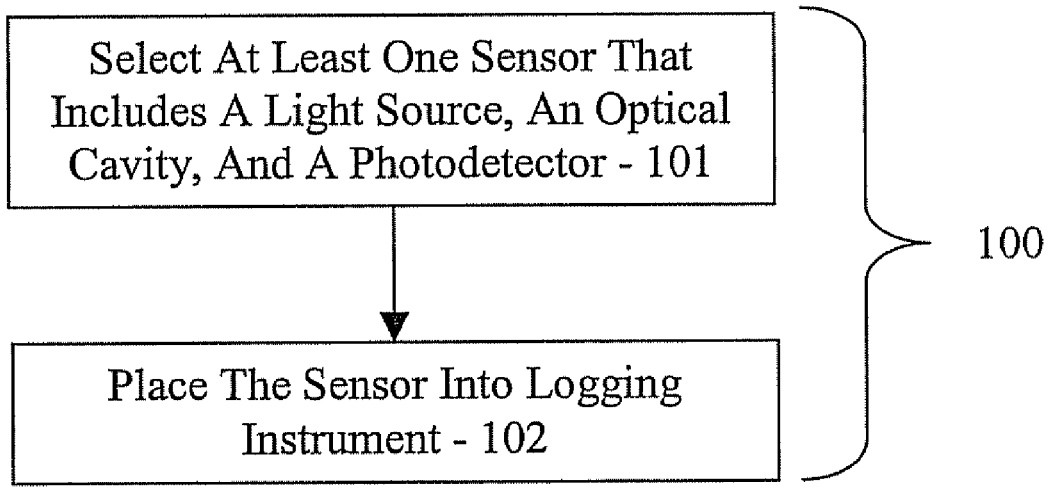
FIG. 11 illustrates an exemplary method for producing the logging instrument.

FIG. 11 presents an exemplary method 100 for producing the logging instrument 10 for measuring acceleration. A first step 101 calls for selecting at least one sensor 5 that includes the broadband light source 21, the optical cavity 20, and the photodetector 23. A second step 102 calls for placing the sensor 5 into the logging instrument 10.

In support of the teachings herein, various analysis components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a sample line, sample storage, sample chamber, sample exhaust, pump, piston, power supply (e.g., at least one of a generator, a remote supply and a battery), vacuum supply, pressure supply, refrigeration (i.e., cooling) unit or supply, heating component, motive force (such as a translational force, propulsional force or a rotational force), magnet, electromagnet, sensor, electrode, transmitter, receiver, transceiver, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for measuring acceleration in a borehole penetrating the earth, the apparatus comprising:
   a logging instrument configured to be conveyed through the borehole; and
   a sensor disposed at the logging instrument, the sensor comprising:
      a light source for illuminating an optical cavity;
      the optical cavity oriented for receiving light from the source, the optical cavity comprising a quality factor greater than or equal to about 10,000; and
      a photodetector for measuring a resonant frequency of light emitted from the optical cavity, wherein the resonant frequency is used to measure the acceleration.

2. The apparatus as in claim 1, wherein the sensor is configured for measuring gravitational acceleration, the sensor further comprises a proof mass connected to the optical cavity.

3. The apparatus as in claim 1, wherein the optical cavity comprises a photonic crystal.

4. The apparatus as in claim 3, wherein the photonic crystal comprises a semiconductor material or a dielectric material or combination thereof.

5. The apparatus as in claim 1, wherein the optical cavity comprises a photonic double heterostructure.

6. The apparatus as in claim 5, wherein the photonic hetero structure comprises a semiconductor material or a dielectric material or combination thereof.

7. The apparatus as in claim 1, wherein the optical cavity comprises a microring.

8. The apparatus as in claim 7, wherein the microring comprises a polymer or a silicon-on-insulator substrate or combination thereof.

9. The apparatus as in claim 1, wherein the optical cavity comprises a microsphere.

10. The apparatus as in claim 9, wherein the microsphere comprises fused silica.

11. A method for measuring acceleration from within a borehole penetrating the earth, the method comprising:
    conveying a logging instrument through the borehole, the logging instrument comprising: an optical cavity configured to emit light having a resonant frequency related to the acceleration and having a quality factor greater than or equal to about 10,000; a light source configured to illuminate the optical cavity; a photodetector configured to measure the resonant frequency of light emitted from the optical cavity;
    taking a first measurement of the resonant frequency of the optical cavity; and
    using the first measurement to determine the acceleration.

12. The method as in claim 11, further comprising taking a second measurement of the resonant frequency of the optical cavity and comparing the first measurement to the second measurement to determine the acceleration.

13. The method as in claim 12, further comprising calibrating the first measurement or the second measurement to a reference value of gravitational acceleration.

14. The method as in claim 13, wherein the reference value comprises a standard.

15. The method as in claim 14, further comprising determining absolute gravitational acceleration by comparing the first measurement to the second measurement.

16. The method as in claim 11, further comprising determining a true vertical depth from the acceleration wherein the acceleration is gravitational acceleration.

17. The method as in claim 11, further comprising determining a change in mass of a material in the earth from the acceleration wherein the acceleration is gravitational acceleration.

18. The method as in claim 17, wherein the material comprises injection media.

19. A computer-readable storage medium comprising computer-executable instructions for determining acceleration from within a borehole penetrating the earth by implementing a method comprising:
    taking a measurement of a resonant frequency of an optical cavity disposed at a logging instrument configured to be conveyed through the borehole, the optical cavity being configured to emit light having a resonant frequency related to the acceleration and having a quality factor greater than or equal to about 10,000; and
    using the measurement to determine the acceleration.

20. A method for producing an apparatus configured for measuring acceleration in a borehole penetrating the earth, the method comprising:
    selecting at least one sensor comprising a light source, an optical cavity, and a photodetector, wherein the optical cavity is configured to emit light having a resonant frequency related to the acceleration and comprises a quality factor greater than or equal to 10,000; and
    placing the sensor into a logging instrument configured to be conveyed through the borehole.

* * * * *